United States Patent
Li et al.

(10) Patent No.: US 9,565,700 B2
(45) Date of Patent: *Feb. 7, 2017

(54) METHODS AND APPARATUS FOR RANDOM ACCESS IN MULTI-CARRIER COMMUNICATION SYSTEMS

(71) Applicant: Neocific, Inc., Bellevue, WA (US)

(72) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: Neocific, Inc., Bellevue, WA (US)

( * ) Notice: Subject to any disclaimer, the term of this patent is extended or adjusted under 35 U.S.C. 154(b) by 281 days.

This patent is subject to a terminal disclaimer.

(21) Appl. No.: 13/899,226

(22) Filed: May 21, 2013

(65) Prior Publication Data

US 2013/0250907 A1    Sep. 26, 2013

Related U.S. Application Data

(63) Continuation of application No. 13/205,579, filed on Aug. 8, 2011, now Pat. No. 8,467,366, which is a
(Continued)

(51) Int. Cl.
*H04W 4/00* (2009.01)
*H04W 74/08* (2009.01)
(Continued)

(52) U.S. Cl.
CPC ...... *H04W 74/0833* (2013.01); *H04L 27/2608* (2013.01); *H04L 27/2613* (2013.01);
(Continued)

(58) Field of Classification Search
CPC ............. H04W 72/0446; H04W 88/08; H04W 72/0453
See application file for complete search history.

(56) References Cited

U.S. PATENT DOCUMENTS 4,977,593 A    12/1990  Ballance et al.
5,991,308 A    11/1999  Fuhrmann et al.
(Continued)

FOREIGN PATENT DOCUMENTS

IL    WO 03075500 A2 *  9/2003  ........... H04L 27/261
KR    20050015119 A     2/2005
(Continued)

OTHER PUBLICATIONS

International Search Report and Written Opinion; International Patent Application No. PCT/US05/08169; Filed Mar. 9, 2005; Applicant: WalticalSolutions, Inc.; Mailed Jun. 9, 2005; 9 pages.
(Continued)

*Primary Examiner* — Hassan Phillips
*Assistant Examiner* — Siren Wei
(74) *Attorney, Agent, or Firm* — Perkins Coie LLP (57) ABSTRACT

A method at a base station of determining a time delay associated with a mobile station in a multiple access wireless communication system. A signal is received from a mobile station over a selected random access subchannel in a selected random access time slot. A Fast Fourier Transform is applied to the received signal to generate a transformed signal in the frequency domain. The transformed signal is then processed in the frequency domain by computing a dot-product to identify a random access sequence carried in the received signal. The received signal is then processed in the time domain by computing a correlation between a time-shifted version of the received signal and the identified random access sequence to determine a time delay associated with the mobile station.

12 Claims, 8 Drawing Sheets

Related U.S. Application Data continuation of application No. 10/583,158, filed as application No. PCT/US2005/008169 on Mar. 9, 2005, now Pat. No. 7,995,967.

(60) Provisional application No. 60/551,589, filed on Mar. 9, 2004.

(51) Int. Cl.
  *H04L 27/26* (2006.01)
  *H04W 52/50* (2009.01)

(52) U.S. Cl.
  CPC ......... *H04L 27/2602* (2013.01); *H04W 52/50* (2013.01); *H04W 74/08* (2013.01)

(56) References Cited

U.S. PATENT DOCUMENTS

| | | | |
|---|---|---|---|
| 6,519,449 B1 | 2/2003 | Zhang et al. | |
| 6,539,320 B1* | 3/2003 | Szajnowski | G01S 13/04 |
| | | | 702/57 |
| 7,995,967 B2 | 8/2011 | Li et al. | |
| 2002/0027957 A1* | 3/2002 | Paulraj | H04B 7/0842 |
| | | | 375/267 |
| 2002/0154705 A1* | 10/2002 | Walton | H04B 7/0417 |
| | | | 375/267 |
| 2002/0159537 A1* | 10/2002 | Crilly, Jr. | H04B 7/0617 |
| | | | 375/267 |
| 2004/0166886 A1* | 8/2004 | Laroia | H04B 7/0491 |
| | | | 455/522 |
| 2005/0080576 A1* | 4/2005 | Dickerson | G06F 17/156 |
| | | | 702/76 |
| 2010/0111017 A1 | 5/2010 | Um et al. | |
| 2011/0292881 A1 | 12/2011 | Li et al. | |

FOREIGN PATENT DOCUMENTS

| | | |
|---|---|---|
| KR | 100585233 B1 | 5/2006 |
| KR | 20060055636 A | 5/2006 |
| WO | WO 03075500 A2 * | 9/2003 |

OTHER PUBLICATIONS

Notice of Allowance, U.S. Appl. No. 13/205,579, Mail Date Mar. 6, 2013, 14 pages.

* cited by examiner

METHODS AND APPARATUS FOR RANDOM ACCESS IN MULTI-CARRIER COMMUNICATION SYSTEMS

CROSS-REFERENCE TO RELATED APPLICATION(S)

This application is a continuation of, and incorporates by reference in its entirety, U.S. patent application Ser. No. 13/205,579, entitled "METHODS AND APPARATUS FOR RANDOM ACCESS IN MULTI-CARRIER COMMUNICATION SYSTEMS", filed Aug. 8, 2011, which is a continuation of U.S. patent application Ser. No. 10/583,158, entitled "METHODS AND APPARATUS FOR RANDOM ACCESS IN MULTI-CARRIER COMMUNICATION SYSTEMS", filed Aug. 27, 2008, which is a U.S. National Stage application of PCT/US05/08169, entitled "METHODS AND APPARATUS FOR RANDOM ACCESS IN MULTI-CARRIER COMMUNICATION SYSTEMS", filed Mar. 9, 2005, which claims the benefit of U.S. Provisional Patent Application No. 60/551,589, entitled "METHODS AND APPARATUS FOR RANDOM ACCESS IN MULTI-CARRIER COMMUNICATION SYSTEMS", filed Mar. 9, 2004.

BACKGROUND

In a wireless communication system, a mobile station first needs to perform a random access for establishing communication with a base station. The random access typically includes two steps: (1) Ranging and (2) Resource Request and Allocation. During Ranging, the mobile station sends a signal to the base station, so that the base station can identify the mobile station and measure the power and time delay of the mobile station, and inform the mobile station for power adjustment and time advance. During Resource Request and Allocation, the uplink and downlink resources for communication are requested and allocated. Ranging is a critical part of multi-carrier wireless communication system, and there are several important issues related to ranging:
1. The bandwidth efficiency of the ranging signals
2. The interference of ranging signal with other uplink signals
3. The detection performance and complexity at the base station receiver The ranging process typically involves an exchange of messages between the base station and the mobile station by which the mobile station aligns itself with the start of each time slot after compensating for propagation delay and other factors. One problem in a shared medium communication network involves the ranging of many mobile stations. When many mobile stations attempt to perform the ranging simultaneously, they are forced to contend for access to the shared channel and it becomes difficult for any of the mobile stations to complete the ranging process due to the large number of collisions. As a result, the time needed for all of the mobile stations to complete the ranging process is excessive, and much bandwidth on the shared channel is wasted.

DETAILED DESCRIPTION

In the following description, the invention is explained with respect to some of its various embodiments, and provides specific details for a thorough understanding. However, one skilled in the art will understand that the invention may be practiced without such details. In other instances, well-known structures and functions have not been shown or described in detail to avoid obscuring aspects of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The embodiments of this invention disclose methods and apparatus for random access in a multi-carrier system. In particular, ranging signals are designed to improve receiving reliability and to reduce interference with other uplink signals. Furthermore, methods and apparatus are described that improve the detection performance at the base station receiver.

In a multi-carrier communication system such as multi-carrier code division multiple access (MC-CDMA) and orthogonal frequency division multiple access (OFDMA) systems, information data are multiplexed on subcarriers that are mutually orthogonal in the frequency domain. In effect, a frequency selective channel is partitioned in frequency into a number of parallel, but small, segments that can be treated as flat fading channels and can employ simple one-tap equalizers. The modulation/demodulation can be performed using the fast Fourier transform (FFT).

In a multi-carrier communication system the physical media resource (e.g., radio or cable) can be divided in both the frequency and time domains. This canonical division provides a high flexibility and fine granularity for resource sharing. A basic structure of a multi-carrier signal in the frequency domain is made up of subcarriers, and within a particular spectral band or channel there are a fixed number of subcarriers. There are three types of subcarriers:

1. Data subcarriers, which carry information data;
2. Pilot subcarriers, whose phases and amplitudes are predetermined and made known to all receivers and which are used for assisting system functions such as estimation of system parameters; and
3. Silent subcarriers, which have no energy and are used for guard-bands and DC carriers.

Figure 1:
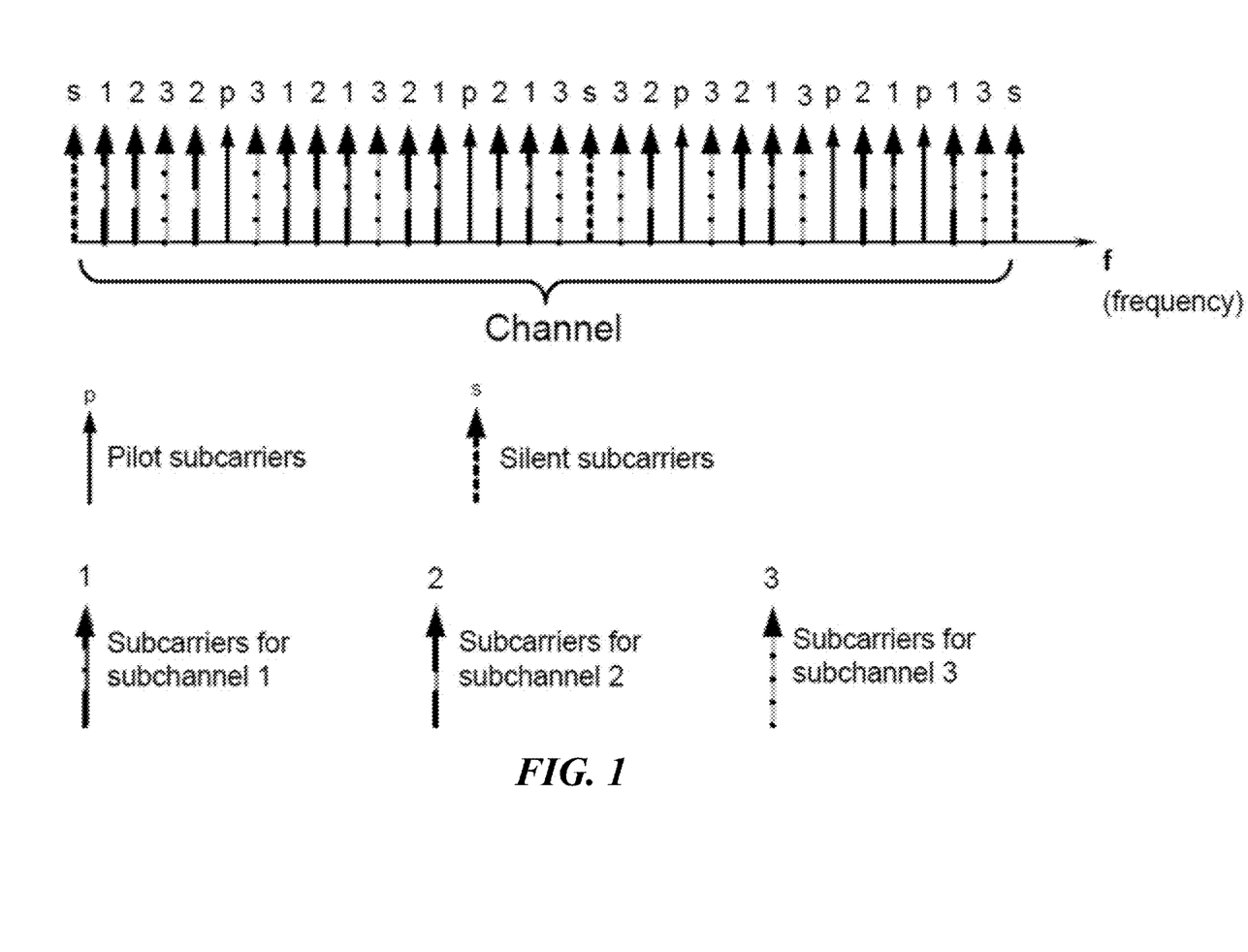
FIG. 1 depicts a basic structure of a multi-carrier signal in the frequency domain, made up of subcarriers.
Figure 2:
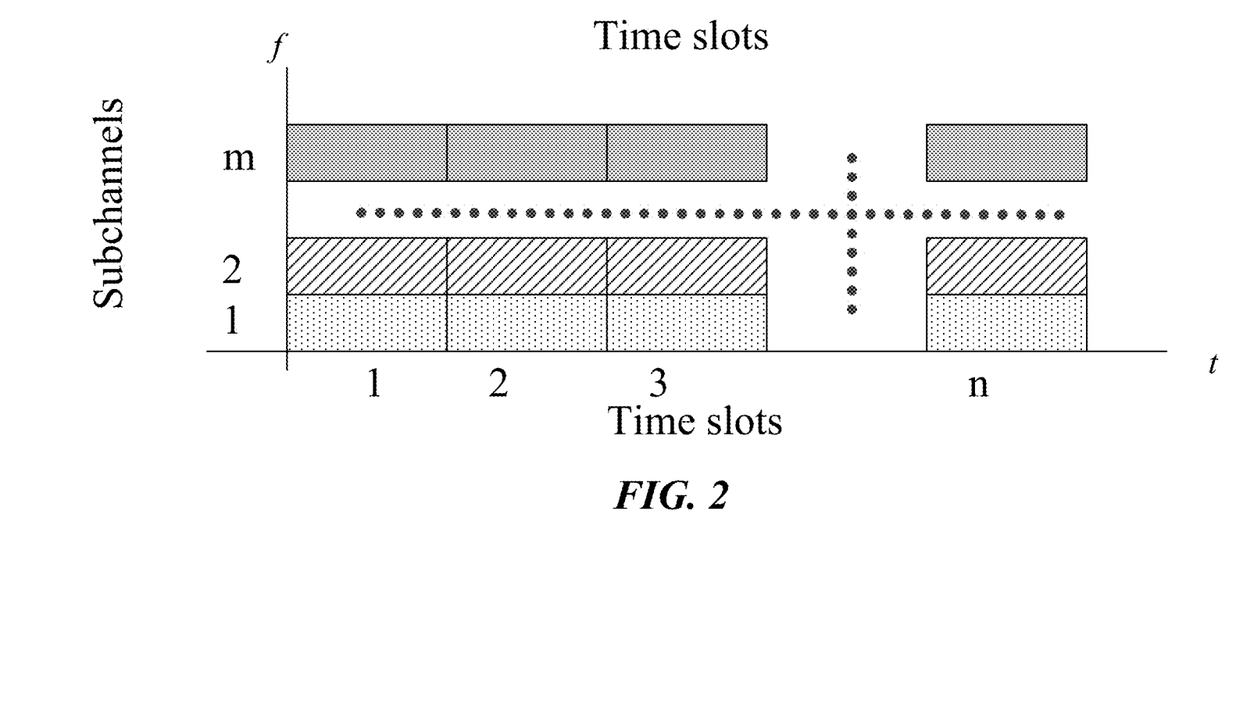
FIG. 2 shows a radio resource divided into small units in both the frequency domain (subchannels) and the time domain (time slots).

The data subcarriers can be arranged into groups called subchannels to support scalability and multiple-access. The carriers forming one subchannel are not necessarily adjacent to each other. Each user may use part or all of the subchannels. The concept is illustrated in FIG. 1 for the interleaved subchannels at the base station transmitter. Data subcarriers can be grouped into subchannels in a particular way and the pilot subcarriers are also distributed over the entire channel in a particular way. The basic structure of a multi-carrier signal in the time domain is made up of time slots to support multiple-access. The resource division in both the frequency and time domains is depicted in FIG. 2.

Figure 3:
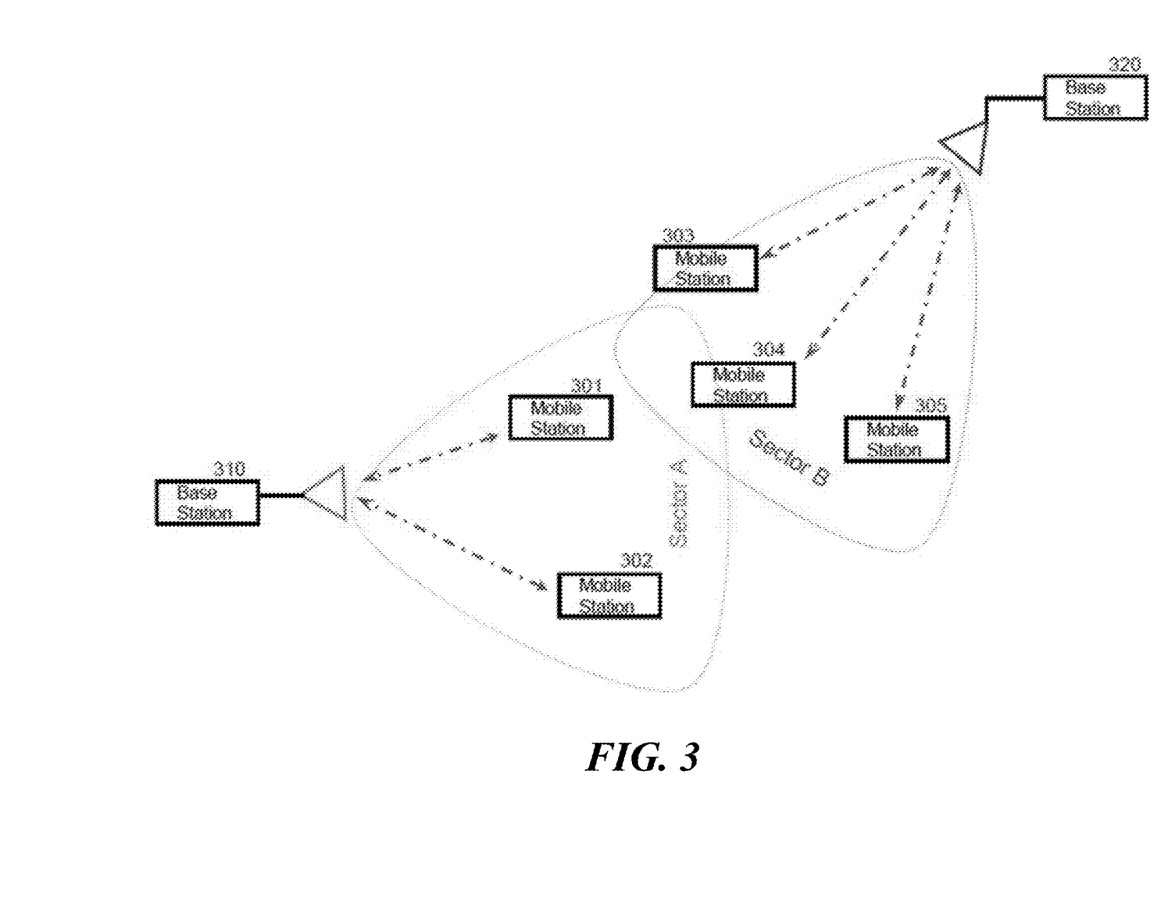
FIG. 3 shows a cellular system with at least one cell and one base station.

FIG. 3 illustrates a typical cellular structure. In this illustration no distinction is made between a cell and a sector. If a cell is divided into sectors, from a system engineering point of view each sector can be considered a cell. In this context, the terms "cell" and "sector" are interchangeable. Both of them are generally called a cell. In the communication system of FIG. 3 Base Station 310 is communicating with Mobile Stations 301 and 302 in Sector A of its cell site while Base Station 320 is communicating with Mobile Stations 303, 304, and 305 in Sector B of its cell site.

Figure 4:
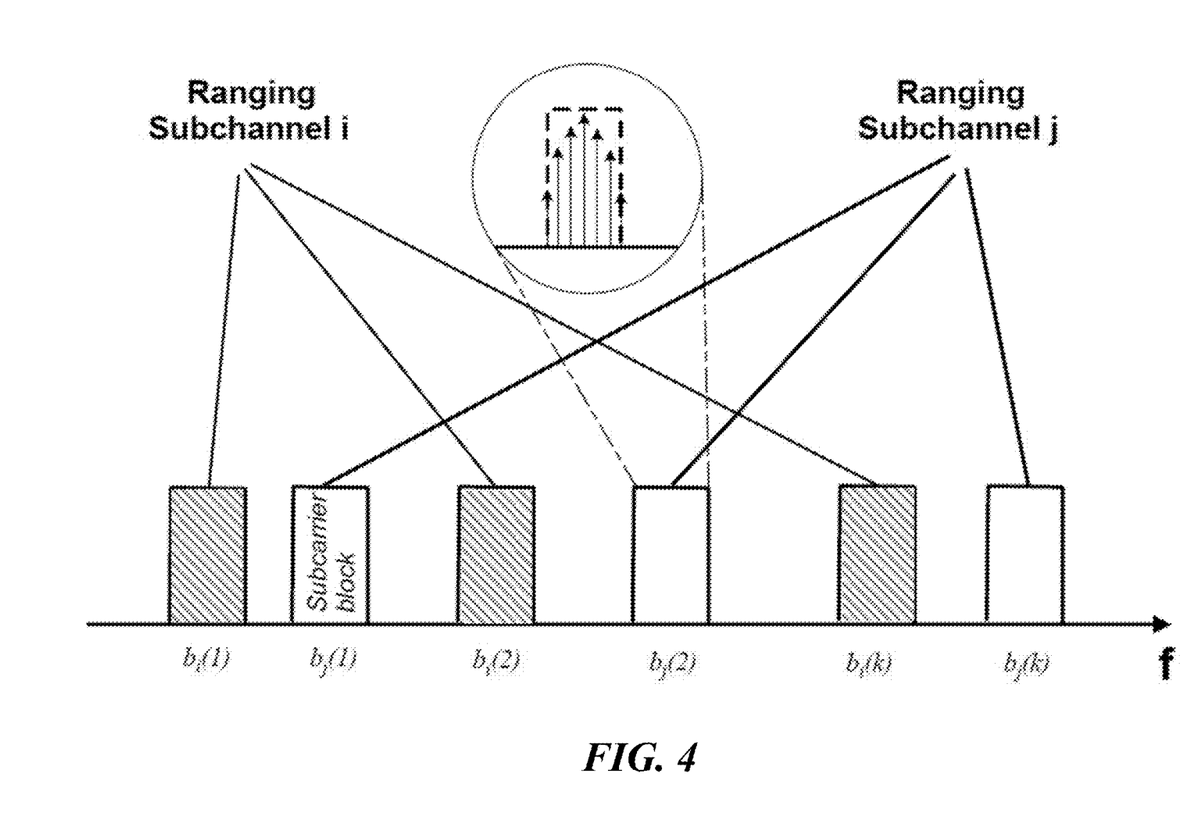
FIG. 4 depicts a ranging subchannel composed of at least one block of subcarriers.

FIG. 4 illustrates two ranging subchannels, each of which is composed of multiple blocks of subcarriers. The subcarriers in each block are contiguous in frequency. FIG. 4 schematically shows that the signal power of the subcarriers towards the boundary (the lower ends and the higher ends in frequency) of a block is lower than that of the subcarriers towards the center of the block. (In a special case, the power levels of the two subcarriers at both ends of a block are set to zero.) Because different factors may cause possible overlap of two subcarrier blocks from to different transmitters, the attenuated boundary subcarriers will minimize the resulting interference.

In accordance with aspects of some embodiments, the ranging signal is carried over a ranging subchannel that contains multiple subcarriers. Either binary or non-binary signals can be modulated on the subcarriers of a ranging subchannel.

The sequence of modulating signals in a ranging subchannel is called a ranging sequence. Multiple ranging sequences are permitted in a cell. A mobile station chooses a ranging sequence for random access and uses the sequence to identify itself in the initial communication with a base station. The period of a ranging signal is called a ranging slot. A ranging slot may last over one or multiple OFDM symbols. Multiple ranging slots can be provided to increase the random access opportunity and reduce the collision probability.

In one embodiment, different cells may have different subcarrier configurations for their ranging subchannels. Different cells may also have different ranging sequence sets. These differences may be used to identify the association of a mobile station with a cell.

Figure 5:
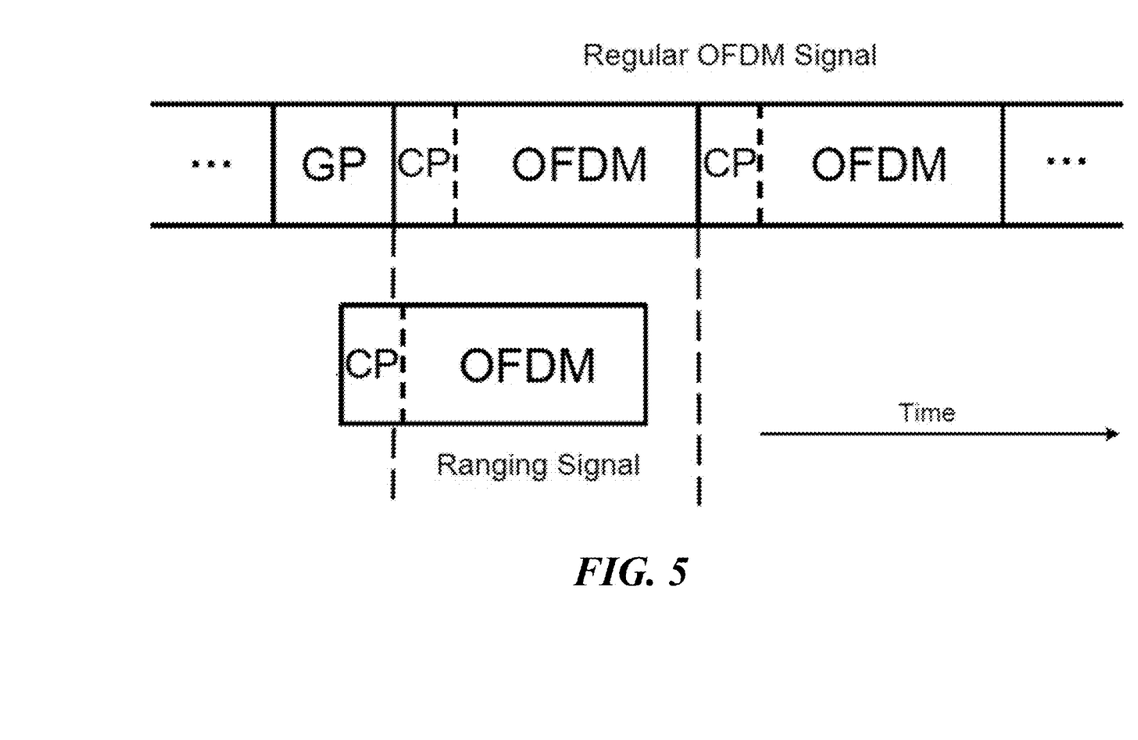
FIG. 5 illustrates a case of time misalignment in a ranging signal, with a base station OFDM time frame, due to uncertainty of a mobile station's round trip delay at an initial stage of random access.
Figure 6:
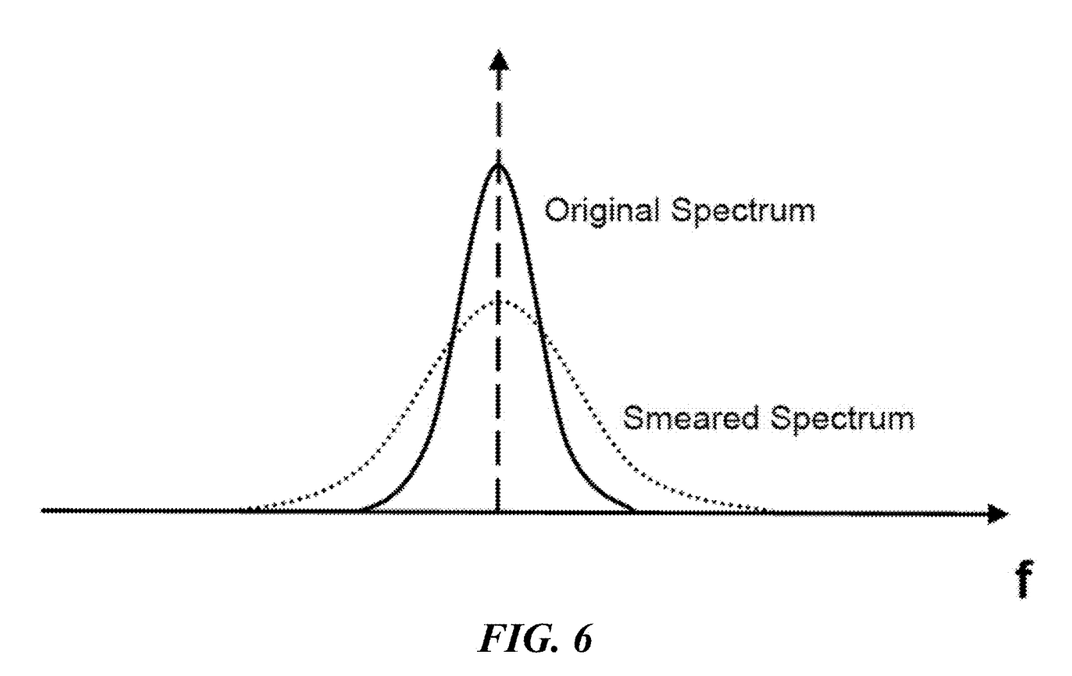
FIG. 6 depicts a smeared spectrum of a subcarrier in a ranging subchannel when the ranging signal is received using a regular OFDM time frame.

FIG. 5 illustrates the timing of regular uplink data signals and ranging signals (with a Guard Period G.P.). In the beginning of a random access attempt, the mobile station is unaware of its round-trip time to the base station. As a result, the arrival time of ranging signal at the base station may be misaligned with other signals which have been synchronized to the base station clock. As depicted in FIG. 5, the random access Ranging Signal does not coincide with the expected arrival time at the base station. As shown in FIG. 6, time misalignment of regular signals and ranging signals can cause spectrum of ranging signals to be smeared when it is received using the OFDM time window of regular signals. Therefore, misaligned subcarriers within a ranging subchannel will interfere with each other and with other data subchannels that are adjacent to them. In the following description, several methods are presented to address such problems.

In one embodiment, the ranging subchannel is composed of multiple blocks of subcarriers. The subcarriers in each block are contiguous in frequency. The signal power of the subcarriers towards the boundary (the lower ends and the higher ends in frequency) of a block is lower than that of the subcarriers towards the center of the block. In a special case, the power levels of the two subcarriers at both ends of a block are set to zero.

In yet another embodiment, each segment of a ranging sequence is a Hadamard sequence and a full ranging sequence is composed of multiple Hadamard sequences. Each segment corresponds to a block of contiguous subcarriers. In Table 1, a typical example is shown for two ranging sequences. Each segment is a 4-bit Hadamard sequence and each ranging sequence is composed of 4 segments. The two ranging sequences are segment-wise orthogonal to each other.

TABLE 1

Example of ranging sequences

| | | | | |
|---|---|---|---|---|
| Ranging Sequence 1 | +1 −1 +1 −1 | +1 +1 +1 +1 | +1 +1 −1 −1 | +1 −1 −1 +1 |
| Ranging Sequence 2 | +1 +1 +1 +1 | +1 −1 −1 +1 | +1 −1 +1 −1 | +1 +1 −1 −1 |

Figure 7:
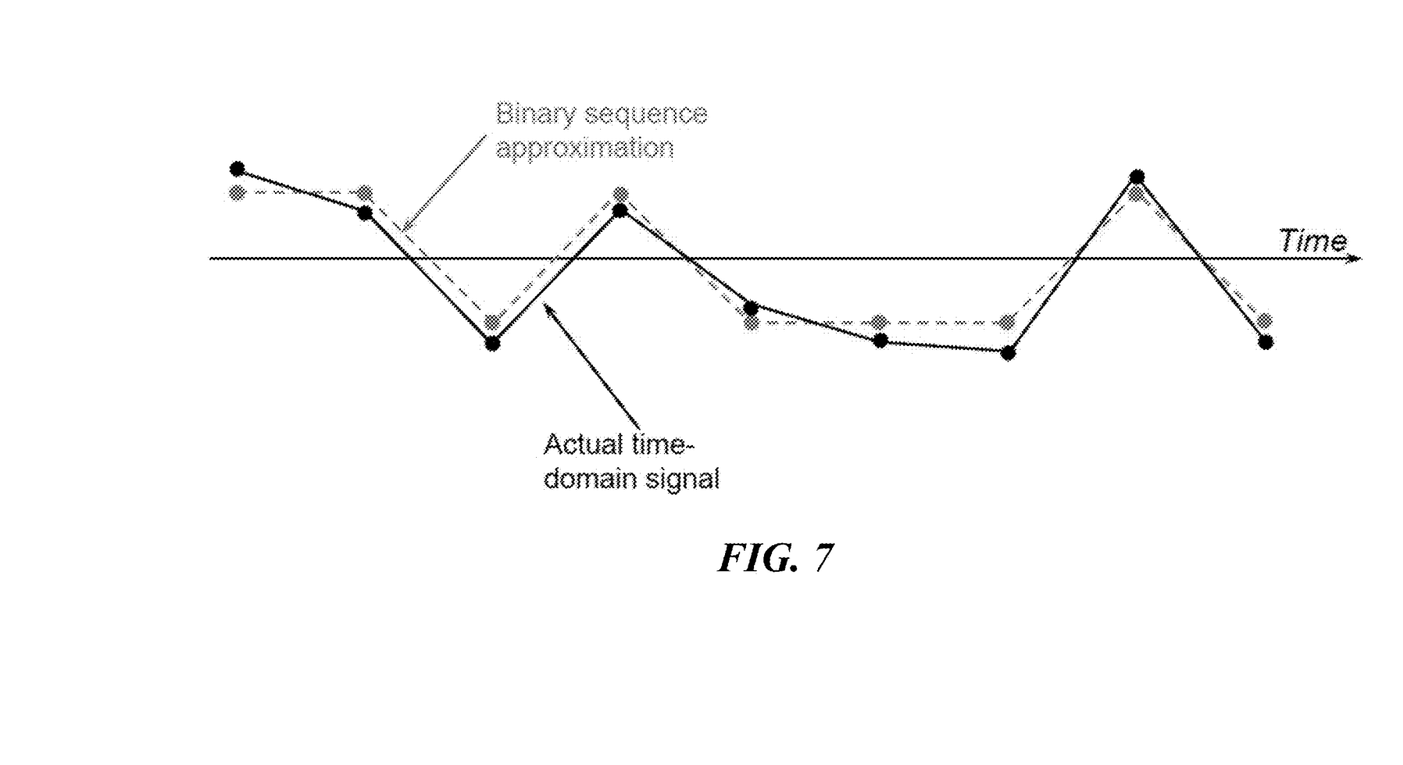
FIG. 7 illustrates a ranging sequence's corresponding time-domain signal that can be approximated with a binary sequence.

In addition, other properties in signal processing can be exploited in sequence design. In one embodiment of the implementation, the ranging sequence is designed such that its corresponding time-domain signal exhibits relatively low peak-to-average power ratio. This improves the power efficiency of the mobile station transmission power amplifier. Furthermore, the ranging signal is designed such that the time signal can be approximated with a binary sequence (e.g., FIG. 7), thereby reducing the complexity of the receiver correlator. While in theory, and even in practice, each modulating digit of a ranging sequence can represent a range of logic levels, a binary format is practically the simplest representation and requires the simplest receiver components for its processing. FIG. 7 illustrates a ranging sequence's corresponding time-domain signal that can be approximated with a binary sequence.

In another embodiment, the blocks of a ranging subchannel can be distributed or allocated in such a way that the autocorrelation of a ranging sequence corresponding to the ranging subchannel, in time-domain, exhibits a set of desired properties such as a narrow main peak and low sidelobes. For example, the blocks can be distributed in the frequency band of interest such that there is minimum redundancy in a co-sampling function. In other words, spacing between the blocks of a ranging subchannel in the frequency domain has no or minimum repetition, as illustrated in FIG. 8, where the spacing consists of the set {d, 2d, 3d, 4d, 5d, 6d}.

Figure 8:
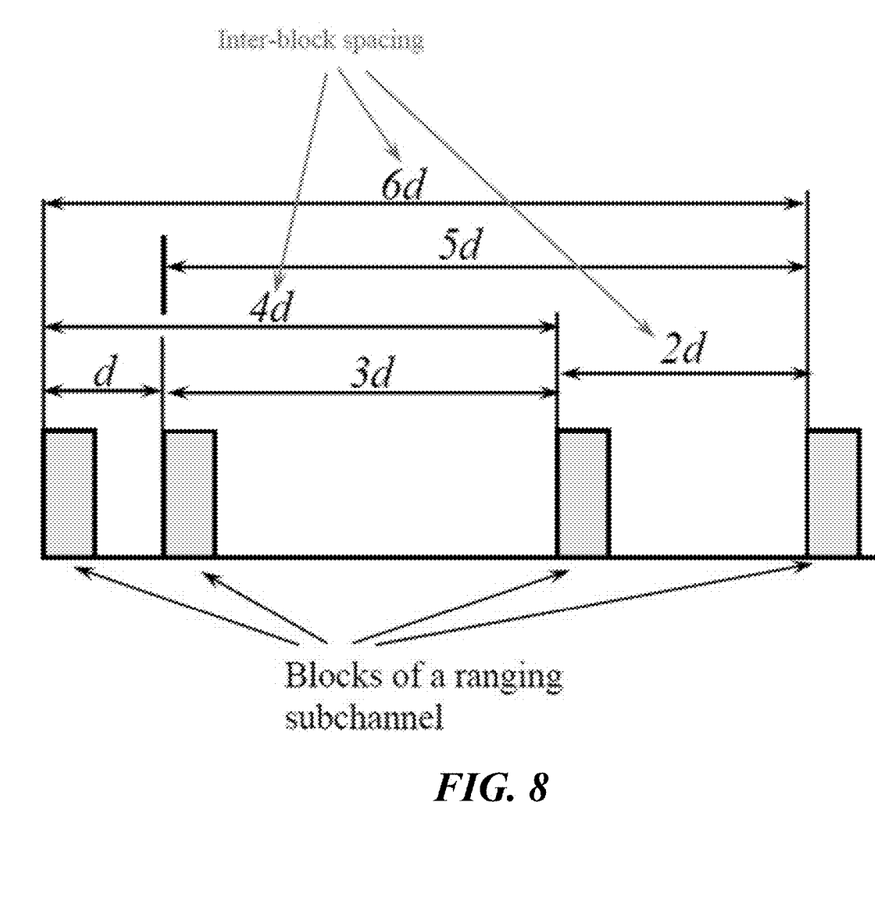
FIG. 8 shows a ranging subchannel arrangement in which spacing between subcarrier blocks in the frequency domain has no, or minimum, repetition.

FIG. 8 is merely an example of such possible arrangements, where an autocorrelation process only produces one major peak, regardless of the ranging sequence carried by the ranging subchannel blocks. During an autocorrelation process, two copies of a ranging signal move in parallel with respect to each other, in a step-wise manner, and at each step the sum of the multiplication of their corresponding values is computed and recorded. Note that in an interval of a ranging subchannel where there are no subcarriers, the ranging signal value is zero. Therefore, employing the proposed arrangements, at any step except for the step during which the two copies of the ranging signal are substantially aligned, most of the non-zero values of either copy will correspond to the zero values of the other copy and the multiplication result of the corresponding values will be zero, which results in low sidelobe values.

With regard to controlling the power settings of a ranging signal, before a random access, a mobile station estimates the path loss from a base station, using the received downlink signal. It uses open-loop power control to set the power level of the ranging signal. In one embodiment, the mobile station adds a negative offset to the open-loop power setting and gradually ramps up the transmission power of the ranging signal as the number of random access failures and retrials increase.

In one embodiment, the base station receiver detects the presence of each ranging signal, its time delay, and its power level through the use of a matched filter, a correlator, or other means in the time domain, the frequency domain, or both.

In another embodiment, when the ranging subchannel is composed of blocks of contiguous subcarriers, the base station performs hierarchical detection: first in frequency domain, then in time domain. The detection process is as follows:

1. The FFT is applied to a selected window of the received time-domain signal, s(t).
2. For a particular ranging subchannel, its received version, $\{\vec{r}(k)\}_{k=1}^{K}$, is correlated in the frequency domain with the ranging sequences associated with the cell, in a segment-wise fashion, where K is the total number of blocks in a ranging subchannel. If the $m^{th}$ sequence associated with the cell is denoted by $\{\vec{b}_m(k)\}_{k=1}^{K}$, the correlation value, $P_m$, is computed by:

$$P_m = \sum_{k=1}^{K} \left| \langle \vec{r}(k) \cdot \vec{b}_m(k) \rangle \right|^2,$$

where the dot-product is computed by:

$$\langle \vec{r}(k) \cdot \vec{b}_m(k) \rangle = \sum_{n=1}^{N} x(k,n) \cdot [c_m(k,n)]^*$$

and where N denotes the number of subcarriers in a block, x(k,n) denotes the received version of the $n^{th}$ subcarrier of the $k^{th}$ block in the given ranging subchannel, and $c_m(k,n)$ represents the value of the $n^{th}$ subcarrier of the $k^{th}$ block in the given ranging subchannel for the $m^{th}$ sequence. It is noted that that both $\vec{r}(k)$ and $\vec{b}_m(k)$ are vectors of the dimension same as the segment length. If $P_m$ is greater than a given threshold, this indicates that a ranging signal corresponding to the $m^{th}$ sequence has been detected.

3. For the ranging signal identified in Step 2, a time-domain correlation of the full sequence of the ranging signal is performed, in a sliding-window fashion, to find the time delay of that ranging signal, that is:

$$C(\tau) = \left| \sum_{t=0}^{T} s(t+\tau) \cdot z^*(t) \right| \text{ for } \tau = 0, 1, \ldots, D$$

where T denotes the length of the time-domain ranging sequence, D corresponds to the maximum time delay allowed by the system, and $z^*(t)$ represents the time-domain signal of the detected ranging sequence. The maximum value of $C(\tau)$ for $\tau=0, 1, \ldots, D$ is the estimate of the power of the ranging signal and the corresponding value of $\tau$ indicates the time delay associated with the ranging signal.

In the case of ranging sequences composed of Hadamard sequences, the dot-products of the received signal and the ranging sequence in a particular segment in Step 2 can be evaluated simultaneously using a single Fast Hadamard Transform (FHT), thereby simultaneously detecting multiple ranging sequences.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. In a multiple access wireless communication system having a plurality of base stations covering a plurality of cells, a method by a base station to determine a time delay associated with a mobile station using a random access subchannel, the method comprising:

allocating, within a communication channel, a random access (RA) subchannel selected from a plurality of frequency subchannels and a RA time slot selected from a plurality of time slots, the RA time slot and RA subchannel associated with the cell in which the base station is located;

receiving a signal from a mobile station over the selected RA subchannel in the selected RA time slot;

processing the received signal by:

applying a Fast Fourier Transform (FFT) to the received signal to generate a transformed signal in the frequency domain;

computing, in the frequency-domain, a dot-product between the transformed signal and an RA sequence specific to the cell in which the base station is located;

analyzing the computed frequency-domain dot-product to identify the RA sequence carried in the received signal;

computing, in the time-domain, a correlation between a time-shifted version of the received signal and the identified RA sequence; and analyzing the computed time-domain correlation to determine a time delay associated with the mobile station;

identifying the mobile station associated with the RA sequence; and transmitting to the identified mobile station an indication of a time advance based on the determined time delay associated with the mobile station.

2. The method of claim 1, wherein the RA subchannel is comprised of subcarriers that are contiguous in frequency.

3. The method of claim 1, wherein processing the received signal further comprises computing, in the frequency-domain, a dot-product between the transformed signal and a second RA sequence specific to the cell in which the base station is located.

4. The method of claim 1, wherein analyzing the computed frequency-domain dot-product to identify the RA sequence carried in the received signal comprises comparing a value of the computed frequency-domain dot-product with a threshold value.

5. In a multiple access wireless communication system having a plurality of base stations covering a plurality of cells, a base station configured to communicate with a mobile station over a random access (RA) subchannel selected from a plurality of frequency subchannels and a RA time slot selected from a plurality of time slots, the RA time slot and RA subchannel associated with the cell In which the base station is located, the base station comprising:

a receiver configured to:

receive a signal from a mobile station over the selected RA subchannel in the selected RA time slot; and a processor configured to process the received signal by:

applying a Fast Fourier Transform (FFT) to the received signal to generate a transformed signal in the frequency domain;

computing, in the frequency-domain, a dot-product between the transformed signal and an RA sequence specific to the cell in which the base station is located;

analyzing the computed frequency-domain dot-product to identify the RA sequence carried in the received signal;

computing, in the time-domain, a correlation between a time-shifted version of the received signal and the identified RA sequence;

analyzing the computed time-domain correlation to determine a time delay associated with the mobile station; and identifying the mobile station associated with the RA sequence; and a transmitter configured to transmit to the identified mobile station an indication of a time advance based on the determined time delay associated with the mobile station.

6. The base station of claim 5, wherein the RA subchannel is comprised of subcarriers that are contiguous in frequency.

7. The base station of claim 5, wherein, to process the received signal, the receiver is further configured to compute, in the frequency-domain, a dot-product between the transformed signal and a second RA sequence specific to the cell in which the base station is located.

8. The base station of claim 5, wherein analyzing the computed frequency-domain dot-product to identify the RA sequence carried in the received signal comprises comparing a value of the computed frequency-domain dot-product with a threshold value.

9. The method of claim 1, wherein the frequency-domain dot-product is computed in a segment-wise fashion.

10. The method of claim 1, wherein the time-domain correlation is computed in a sliding-window fashion.

11. The base station of claim 5, wherein the frequency-domain dot-product is computed in a segment-wise fashion.

12. The base station of claim 5, wherein the time-domain correlation is computed in a sliding-window fashion.

* * * * *